United States Patent [19]
Estep et al.

[11] 3,807,141
[45] Apr. 30, 1974

[54] APPARATUS FOR REDUCING THE HYDROGEN SULPHIDE AND HYDROGEN POLYSULPHIDE CONTENT OF LIQUID SULPHUR

[75] Inventors: James W. Estep; Edward W. Plum, both of Calgary, Canada

[73] Assignee: Texas Gulf, Inc., New York, N.Y.

[22] Filed: Feb. 17, 1972

[21] Appl. No.: 227,047

Related U.S. Application Data
[62] Division of Ser. No. 115,648, Feb. 16, 1971.

[52] U.S. Cl. ............... 55/159, 159/193, 23/283, 23/270.5
[58] Field of Search... 23/308 S, 267 R, 283, 252 R, 23/270.5, 293; 159/193; 55/159, 193, 39, 36, 38, 41, 52, 46

[56] References Cited
UNITED STATES PATENTS

| | | | |
|---|---|---|---|
| 2,020,250 | 11/1935 | Stephens | 159/193 |
| 3,116,999 | 1/1964 | Armbruster | 55/159 |
| 2,151,644 | 3/1939 | Stephens | 55/193 |
| 1,447,249 | 3/1923 | Kitchen | 55/159 |
| 1,800,366 | 4/1931 | Stewart | 202/221 |
| 2,047,157 | 7/1936 | Rodman | 55/193 |
| 2,570,171 | 10/1951 | Kohorn | 55/193 |

FOREIGN PATENTS OR APPLICATIONS 1,278,334   10/1961   France ................................ 55/129

Primary Examiner—Norman Yudkoff
Assistant Examiner—S. J. Emery

[57] ABSTRACT

Apparatus for reducing the hydrogen sulphide and hydrogen polysulphide content of liquid sulphur wherein the liquid sulphur is aged and agitated by passage through a storage tank and scrubber where the surface area of the liquid sulphur is increased and the dissolved hydrogen sulphide is allowed to escape. The apparatus also enables the more thermally stable polysulphides to break down into hydrogen sulphide gas and liquid sulphur. By repeated recycling the hydrogen sulphide and polysulphide content of the liquid sulphur can be reduced to negligible amounts.

4 Claims, 2 Drawing Figures

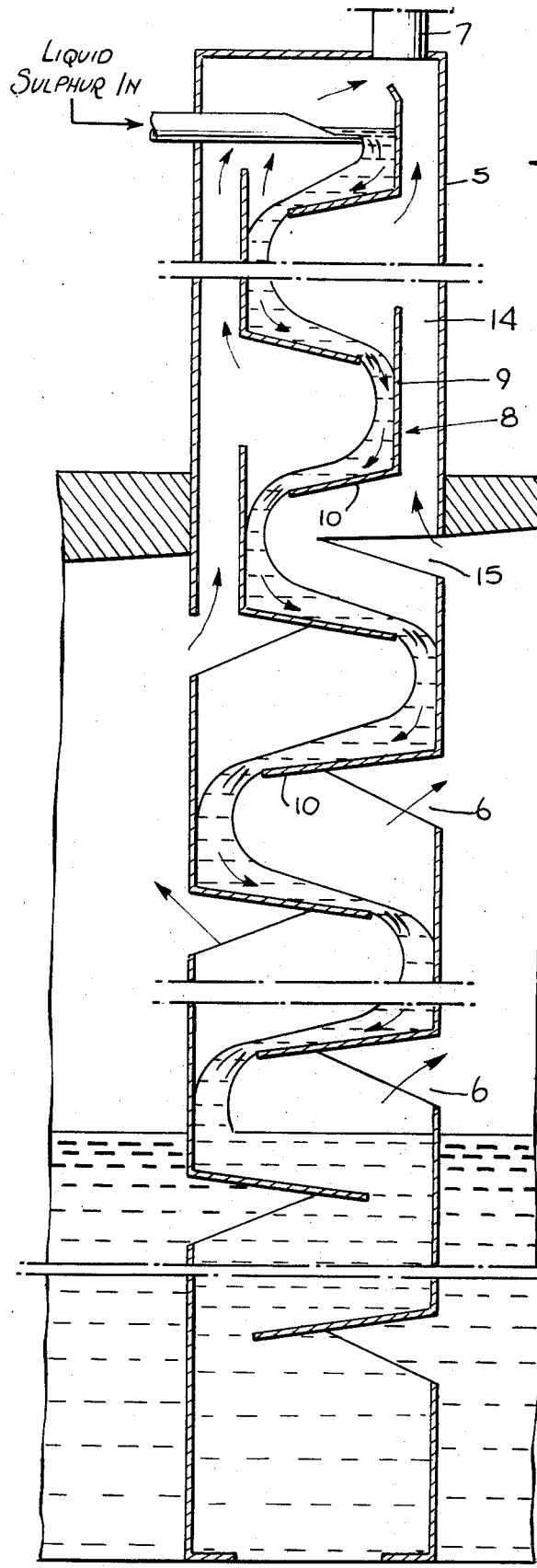
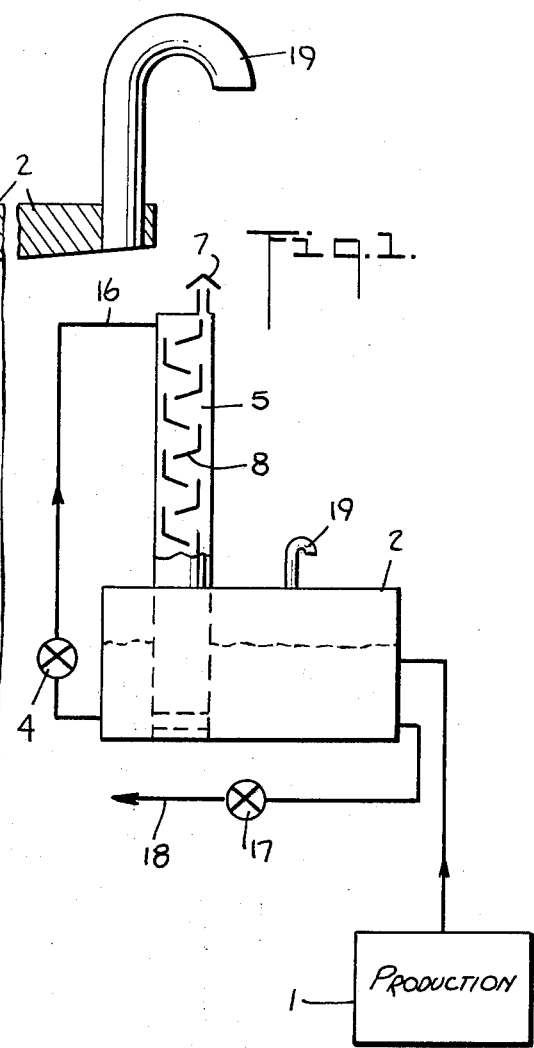
Fig. 2.
Fig. 1.

APPARATUS FOR REDUCING THE HYDROGEN SULPHIDE AND HYDROGEN POLYSULPHIDE CONTENT OF LIQUID SULPHUR

This is a division of application Ser. No. 115,648, filed Feb. 16, 1971.

BACKGROUND OF THE INVENTION

1. Field Of The Invention

This invention relates to apparatus for removing hydrogen sulphide and polysulphides in liquid sulphur subsequent to production of liquid sulphur by the Claus process.

2. The State Of The Prior Art

As is well known liquid sulphur can be produced in the Claus process by passing hydrogen sulphide ($H_2S$) through a combustion chamber where most of the hydrogen sulphide is burned to produce sulphur and in such a manner that approximately one-third of the remaining volume of hydrogen sulphide is converted into sulphur dioxide. After cooling, hydrogen sulphide and sulphur dioxide are passed through a catalyst converter where the hydrogen sulphide and sulphur dioxide react to form liquid sulphur and water.

Liquid sulphur prepared by this process often contains liquid hydrogen polysulphides as impurities [$H_2S$ (gas) + (X−1)S (liquid) ⇌ $H_2S_x$ (liquid)]. The liquid polysulphides will slowly decompose and evolve as $H_2S$ gas over a period of time to create danger to equipment and the health of employees. If the liquid sulphur is shipped without removing the impurities and they gradually evolve as $H_2S$ during shipment, sufficiently high levels of hydrogen sulphide may be evolved and under certain conditions an explosion might occur. Similarly, the escaping gas evolved during shipment could endanger workmen when the container is opened.

Previous attempts at reducing the hydrogen sulphide content of liquid sulphur have usually involved more complicated processes, impractical for commercial operations. For example, in U.S. Pat. No. 3,364,655 a process is described in which liquid sulphur is degasified by atomizing liquid sulphur. By the process taught by this patent ammonia is added and the temperature of the liquid sulphur cooled to approximately 125°C. The liquid sulphur then is atomized by passage through nozzles of approximately 7 mm. in diameter. While this system may be used on a small scale, it would have inherent problems when practiced on the large commercial scale as contemplated by our invention. Not only are the nozzles of small capacity and thus limiting production to a small scale but the necessity of adding ammonia introduces another ingredient which may react to form stable ammonia polysulphide which would be a contaminant in the liquid sulphur, especially if the liquid sulphur is subsequently used to manufacture sulphuric acid. The necessity to cool the liquid sulphur also requires additional cooling equipment, another disadvantage. Finally, no mention is made in the prior art of hydrogen polysulphides and the necessity for their removal.

SUMMARY OF THE INVENTION

Accordingly, it is an object of this invention to overcome the dangers in the shipment and storage of liquid sulphur by removing substantially all the hydrogen sulphide and dissolved hydrogen polysulphides contaminants in the liquid sulphur, without the addition of other contaminants such as ammonia or hydrogen sulphide reacting amines to further contaminate the liquid sulphur by increasing the carbon or ash content.

According to this invention the liquid sulphur produced by the Claus process is pumped from the production plant to specially designed tanks where the liquid sulphur in one embodiment is continuously agitated by recycling the liquid sulphur over a series of baffles in a vented tower for a period of one to nine days during which the surface area of the liquid sulphur is increased alloying the polysulphides to break down into liquid sulphur and hydrogen sulphide gas which escapes from the liquid. In another embodiment of our invention the liquid sulphur is stored for a period of time, i.e., one to eight days and then passed over a series of baffles in a vertical vented tower to accomplish the same objective of removing the impurities.

DESCRIPTION OF THE DRAWINGS

Other features and objects of the invention will become apparent in the following description, claims, and in the drawings in which:

FIG. 1 is a schematic flow diagram of one embodiment of the process of this invention; and FIG. 2 is a cross-sectional view of the tower apparatus used in the process of this invention.

DETAILED DESCRIPTION OF THE DRAWINGS

Referring to FIG. 1, which exemplifies the features of one embodiment of our invention, liquid sulphur at approximately 280°F. and containing hydrogen polysulphides is pumped from a Claus process production facility 1 through appropriate piping to a large storage tank 2. This tank may be of any size and in one embodiment is a 13,000 long ton storage tank in which the liquid sulphur is stored at atmospheric pressure and 280°F. By the practice of this invention the equilibrium between hydrogen polysulphide, hydrogen sulphide and liquid sulphur is shifted and the hydrogen polysulphides will decompose to form hydrogen sulphide and liquid sulphur as follows: $H_2S_x$ (liquid) ⇌ $H_2S\uparrow$ (gas) + (X−1)S (liquid). In order to provide agitation for removing the entrapped hydrogen sulphide a vertical scrubber or splash tower 5 is mounted within tank 2 in such a manner that it extends from the bottom of tank 2 through and beyond the top of tank 2 as shown in FIGS. 1 and 2. After the tank has been partially filled the liquid sulphur stored in the tank is continuously pumped from the tank 2 by pump 4 to the top of the scrubber or splash tower 5 through pipe 16 where the liquid sulphur is then allowed to flow in cascade fashion over a series of staggered internal baffles 8. (See FIG. 2.)

The tower itself may be of any geometrical design, but in the embodiment shown herein it is of a generally cylindrical configuration. The L-shaped baffles 8 in the upper portion of the tower 5, disposed above tank 2, are composed of a straight vertical member 9 and a straight surface 10, which is pitched at a slight angle downward to allow the liquid sulphur to flow off of one baffle on to the next. In the upper portion of the tower 5 the vertical member 9 is so constructed and attached to the tower that an annular passage 14 is provided between the vertical member 9 and the shell of tower 5. In this manner passage 14 allows hydrogen sulphide gas escaping within the tower 5 to pass up to the vent and hood 7 where it is then vented into the atmosphere. Hydrogen sulphide gas collected in the tank 2 is vented to atmosphere through several tank vents 19.

In the portion of the tower located within the tank, the baffles 8 are composed of straight plates 10, one end of which is cut in an arc to match the shell of tower 5 and is attached directly to the sides of the tower by any conventional means. By designing the lower portion of the tower in this manner the flow area of the sulphur is increased. These lower plates 10 continue to the bottom of tower 5 so that even when the sulphur in tank 2 is low the incoming sulphur is not allowed to fall free for more than one foot. This avoids static electrical charge buildup on the sulphur and possible spark ignition resulting in fire or explosion.

Thus, in the practice of this invention liquid sulphur flows through pipe 16 down the side or vertical portion 9 of the upper baffles, on to the pitched surface 10 of the upper baffles and on to the next baffle where the process continues. This zigzag flow of the liquid sulphur down the interior of tower 5 is shown in FIG. 2.

This flow within the tower agitates the liquid, increases the surface area of the liquid sulphur and facilitates the break down of the hydrogen polysulphides into $H_2S$ and liquid sulphur. The $H_2S$ gas then escapes from the sulphur, passes through the openings 6 in the lower portion of the tower within tank 2 and collects in the upper portion of the tank 2.

After the liquid sulphur has passed through the scrubber or splash tower 5 it spreads out over the surface of the liquid sulphur in the tank allowing more gaseous hydrogen sulphide to escape. Openings 15 are provided in the tower near the top of the tank to vent the hydrogen sulphide gas from the tank into the passages 14 behind the upper baffles where the gas passes up the interior portion of the tower and escapes into the atmosphere through the vent and hood 7. Several tank vents 19 also allow hydrogen sulphide gas collected in tank 2 to be vented to the atmosphere.

The typical dimensions for the splash tower shown in FIG. 2 would be a tower of some 32 feet in height of which 5 feet protrudes above the top of the storage tank. The interior baffles could be approximately 16 inches in height with a vertical separation of 12 inches between each baffle at the center point of the tower. A typical slope for the horizontal surface of each baffle would be 1 inch per 11 inches.

After sufficient treatment, the purified liquid sulphur in tank 2 is pumped from the tank by pump 17 through the appropriate piping 18 to tank cars or other suitable containers for shipment to the ultimate users.

Another alternative embodiment which can easily be adapted to this invention is to collect the escaping gas at vents 7 and 19 and recycle the gaseous hydrogen sulphide through the production facility 1 to convert this gaseous hydrogen sulphide into liquid sulphur.

In order to determine the effectiveness of this invention in reducing hydrogen sulphide and polysulphide in liquid sulphur, the following tests were conducted by bubbling nitrogen through a weighed sample of sulphur, then passing the nitrogen through an absorption train consisting of a magnesium perchlorate drier, then followed by passage through an activated copper phosphate hydrogen sulphide absorber. When tested by this process the following example illustrates the effectiveness of this invention in reducing hydrogen polysulphide in liquid sulphur. Liquid sulphur samples taken from the 13,000 long ton storage tank prior to treatment in the scrubber or splash tower, when analyzed for equivalent hydrogen sulphide content according to the process described above, have been found to contain between 170 ppm (parts per million) and 218 ppm. After aging for four days and one pass through the splash tower, the equivalent hydrogen sulphide content of the liquid sulphur had been reduced to between 76 and 60 ppm. After two passes through the splash tower, the equivalent hydrogen sulphide content had been reduced to between 46 and 39 ppm. By continuously passing the liquid sulphur through the splash tower, the equivalent hydrogen sulphide content of the liquid sulphur can be reduced even further.

As a further illustration of the effectiveness of our process, liquid sulphur which had been pretreated in accordance with this invention and shipped in a sealed tank car for a period of eight days evolved hydrogen sulphide at the rate of 1.88 cubic feet per long ton. Liquid sulphur which had not been treated according to this invention but was shipped directly from the production facility in a sealed tank car for the same amount of time, evolved hydrogen sulphide at the rate of 4.99 cubic feet per long ton. This marked reduction in equivalent hydrogen sulphide was accomplished by only one passage through the splash tower.

While our preferred embodiment utilizes a continuous circulation of the liquid sulphur during storage, another alternative embodiment which we have found most advantageous is to use two tanks. In one tank the material is stored for a period of one to eight days during which time the hydrogen sulphide slowly evolves and is vented into the atmosphere. After this storage period the liquid sulphur is then pumped to a second tank which contains the tower as described above and shown in FIG. 2. While the liquid sulphur is in this second tank it is circulated through the splash tower for a sufficient period of time to circulate all the material at least twice. In this manner the hydrogen polysulphide content can be similarly reduced to sufficiently low levels to provide for safe handling during storage and shipment.

While we have illustrated the principle of our invention by a splash tower other apparatus may be equally adaptable. For example, a flat shallow tank, in which the liquid sulphur is slowly allowed to flow, would allow the hydrogen sulphide to escape. Another possible device might be a tank in which agitation continuously circulates the liquid sulphur, exposes different parts of the sulphur to the air and allows the hydrogen sulphide to escape.

As can be seen from the above description, apparatus is provided which greatly reduces the hydrogen sulphide and polysulphide content of liquid sulphur, allowing for longer storage and shipment periods, safety in handling of the liquid sulphur and increased recovery of the hydrogen sulphide dissolved in liquid sulphur.

It is to be understood that changes and additions may be made by those skilled in the art without departing from the scope and spirit of the invention.

What is claimed is:

1. Apparatus for removing hydrogen sulphide and hydrogen polysulphide contaminants from liquid sulphur comprising -
    an enclosed storage tank having means associated therewith for maintaining liquid sulphur therein at substantially atmospheric pressure and at a temperature of about 280°F., first pump means for introducing raw liquid sulphur containing said contaminants into said tank, second pump means for delivering purified liquid sulphur from said tank for further utilization, a vertical scrubbing tower disposed within said tank and having an upper portion thereof extending above said tank, said tower in its said upper portion having a plurality of vertically spaced internal substantially L-shaped baffle plates having upwardly extending portions joined at their lower ends to inwardly and downwardly extending portions, said plates mounted in said tower at radially spaced positions from the inner surface of said tower in an alternating fashion to provide a cascade structure with an annular venting passage at the periphery thereof adapted for the downward flow of liquid sulphur and the upward flow of hydrogen sulphide, the lower portion of said tower disposed within said tank having a plurality of vertically spaced baffle plates mounted on the interior wall of said tower in an alternating cascade manner, third pump means for delivering liquid sulphur from said tank to the top of said tower.

2. Apparatus for removing hydrogen sulphide and hydrogen polysulphide contaminants from liquid sulphur comprising - an enclosed storage tank having means associated therewith for maintaining liquid sulphur therein at substantially atmospheric pressure and at a temperature of about 280°F., first pump means for introducing raw liquid sulphur containing said contaminants into said tank, second pump means for delivering purified liquid sulphur from said tank for further utilization, a vertical scrubbing tower disposed within said tank and having an upper portion thereof extending above said tank, said tower in its said upper portion having a plurality of vertically spaced internal substantially L-shaped baffle plates having upwardly extending portions joined at their lower ends to inwardly and downwardly extending portions, said plates mounted in said tower at radially spaced positions from the inner surface of said tower in an alternating fashion to provide a cascade structure with an annular venting passage at the periphery thereof adapted for the downward flow of liquid sulphur and the upward flow of hydrogen sulphide, the lower portion of said tower disposed within said tank having a plurality of vertically spaced baffle plates mounted on the interior wall of said tower in an alternating cascade manner and having vent means adjacent the bottom of each said plate communicating with said tank, third pump means for delivering liquid sulphur from said tank to the top of said tower.

3. Apparatus for removing hydrogen sulphide and hydrogen polysulphide contaminants from liquid sulphur comprising - an enclosed storage tank having means associated therewith for maintaining liquid sulphur therein at substantially atmospheric pressure and at a temperature of about 280°F., first pump means for introducing raw liquid sulphur containing said contaminants into said tank, second pump means for delivering purified liquid sulphur from said tank for further utilization, a vertical scrubbing tower disposed within said tank and having an upper portion thereof extending above said tank, said tower in its said upper portion having a plurality of vertically spaced internal substantially L-shaped baffle plates having upwardly extending portions joined at their lower ends to inwardly and downwardly extending portions, said plates mounted in said tower at radially spaced positions from the inner surface of said tower in an alternating fashion to provide a cascade structure with an annular venting passage at the periphery thereof adapted for the downward flow of liquid sulphur and the upward flow of hydrogen sulphide, the lower portion of said tower disposed within said tank having a plurality of vertically spaced baffle plates mounted on the interior wall of said tower in an alternating cascade manner and having first vent means adjacent the bottom of each said plate communicating with said tank, third pump means for delivering liquid sulphur from said tank to the top of said tower, second vent means on said tower communicating with said annular venting passage adapted to deliver hydrogen sulphide exteriorly thereof.

4. Apparatus for removing hydrogen sulphide and hydrogen polysulphide contaminants from liquid sulphur comprising - an enclosed storage tank having means associated therewith for maintaining liquid sulphur therein at substantially atmospheric pressure and at a temperature of about 280°F., first pump means for introducing raw liquid sulphur containing said contaminants into said tank, second pump means for delivering purified liquid sulphur from said tank for further utilization, a vertical scrubbing tower disposed within said tank and having an upper portion thereof extending above said tank, said tower in its said upper portion having a plurality of vertically spaced internal substantially L-shaped baffle plates having upwardly extending portions joined at their lower ends to inwardly and downwardly extending portions, said plates mounted in said tower at radially spaced positions from the inner surface of said tower in an alternating fashion to provide a cascade structure with an annular venting passage at the periphery thereof adapted for the downward flow of liquid sulphur and the upward flow of hydrogen sulphide, the lower portions of said tower disposed within said tank having a plurality of vertically spaced baffle plates mounted on the interior wall of sd tower in an alternating cascade manner and having first vent means adjacent the bottom of each said plate communicating with said tank, third pump means for delivering liquid sulphur from said tank to the top of said tower, second vent means on said tower communicating with said annular venting passage adapted to deliver hydrogen sulphide exteriorly thereof, and third vent means on said tank to deliver hydrogen sulphide exteriorly of said tank.

* * * * *

UNITED STATES PATENT OFFICE
CERTIFICATE OF CORRECTION

Patent No. 3,807,141                    Dated  April 30, 1974

Inventor(s)  James W. Estep and Edward W. Plum

It is certified that error appears in the above-identified patent and that said Letters Patent are hereby corrected as shown below:

Col. 2, line 10, change "alloying" to -- allowing -- ;

Col. 6, line 54, change "sd" to -- said -- .

Signed and sealed this 24th day of September 1974.

(SEAL)
Attest:

McCOY M. GIBSON JR.                    C. MARSHALL DANN
Attesting Officer                      Commissioner of Patents